(No Model.) 3 Sheets—Sheet 2.
J. DAIN, Jr.
HAY STACKER.
No. 268,390. Patented Dec. 5, 1882.
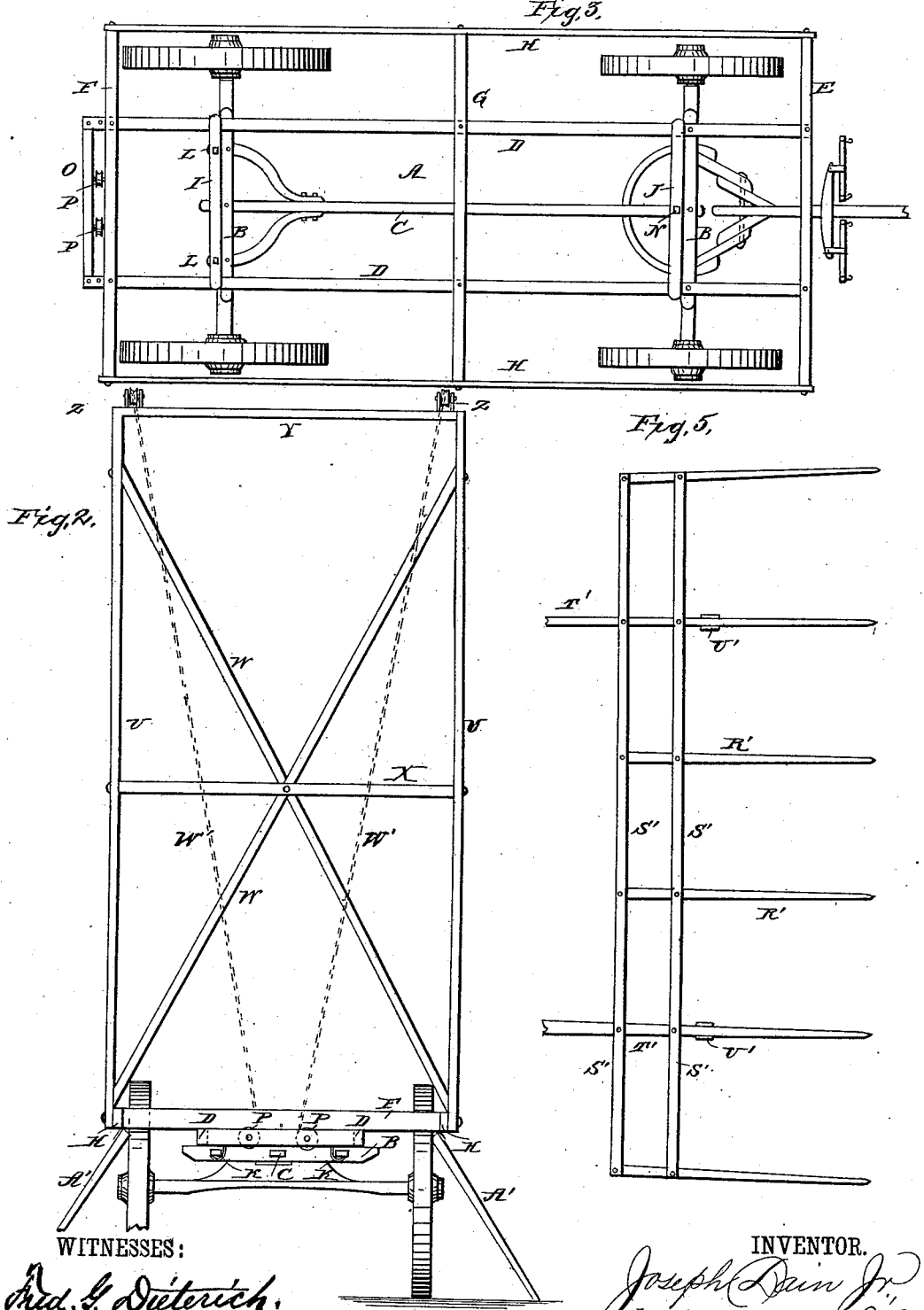
WITNESSES:
INVENTOR.

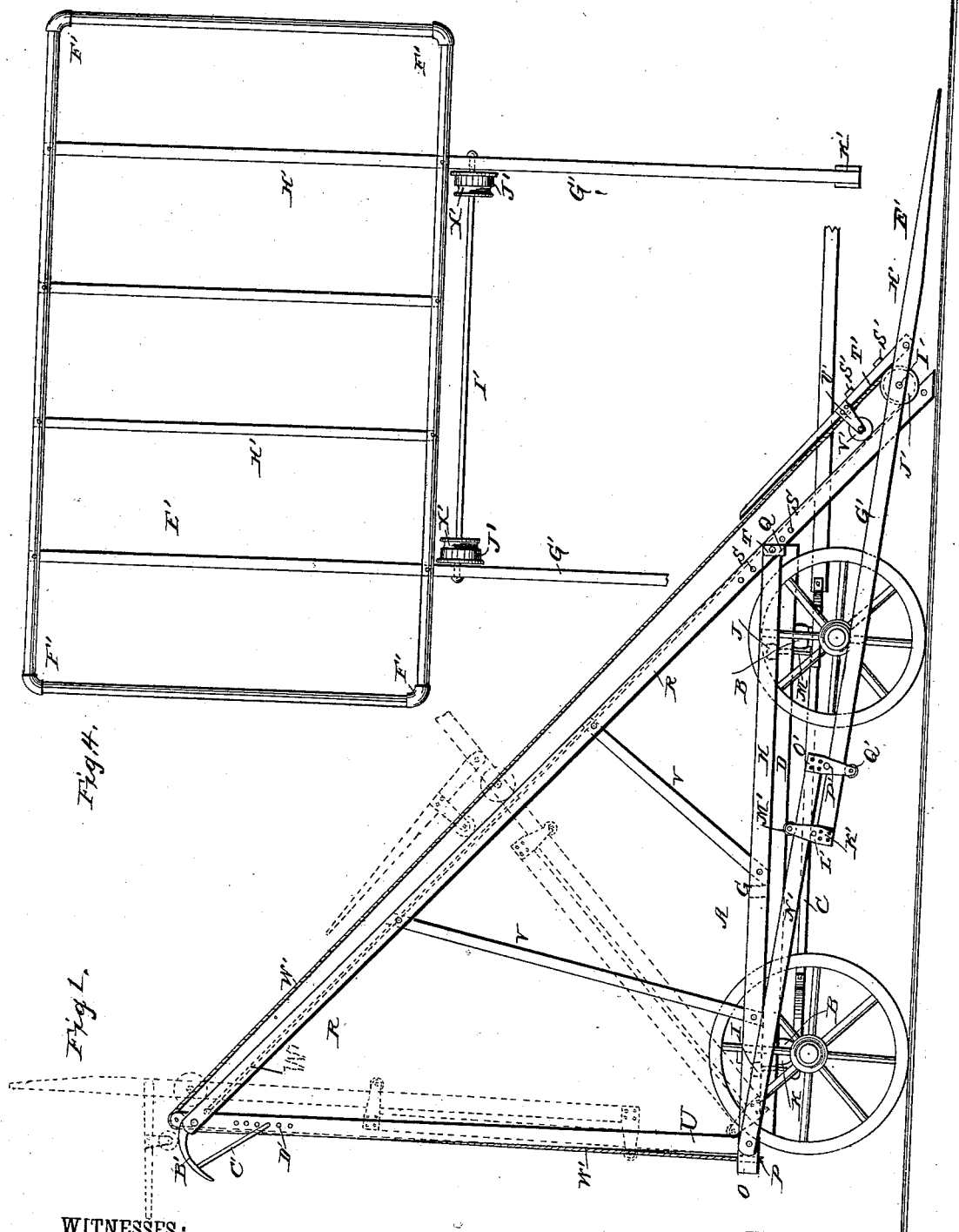

(No Model.) 3 Sheets—Sheet 3.
J. DAIN, Jr.
HAY STACKER.
No. 268,390. Patented Dec. 5, 1882.
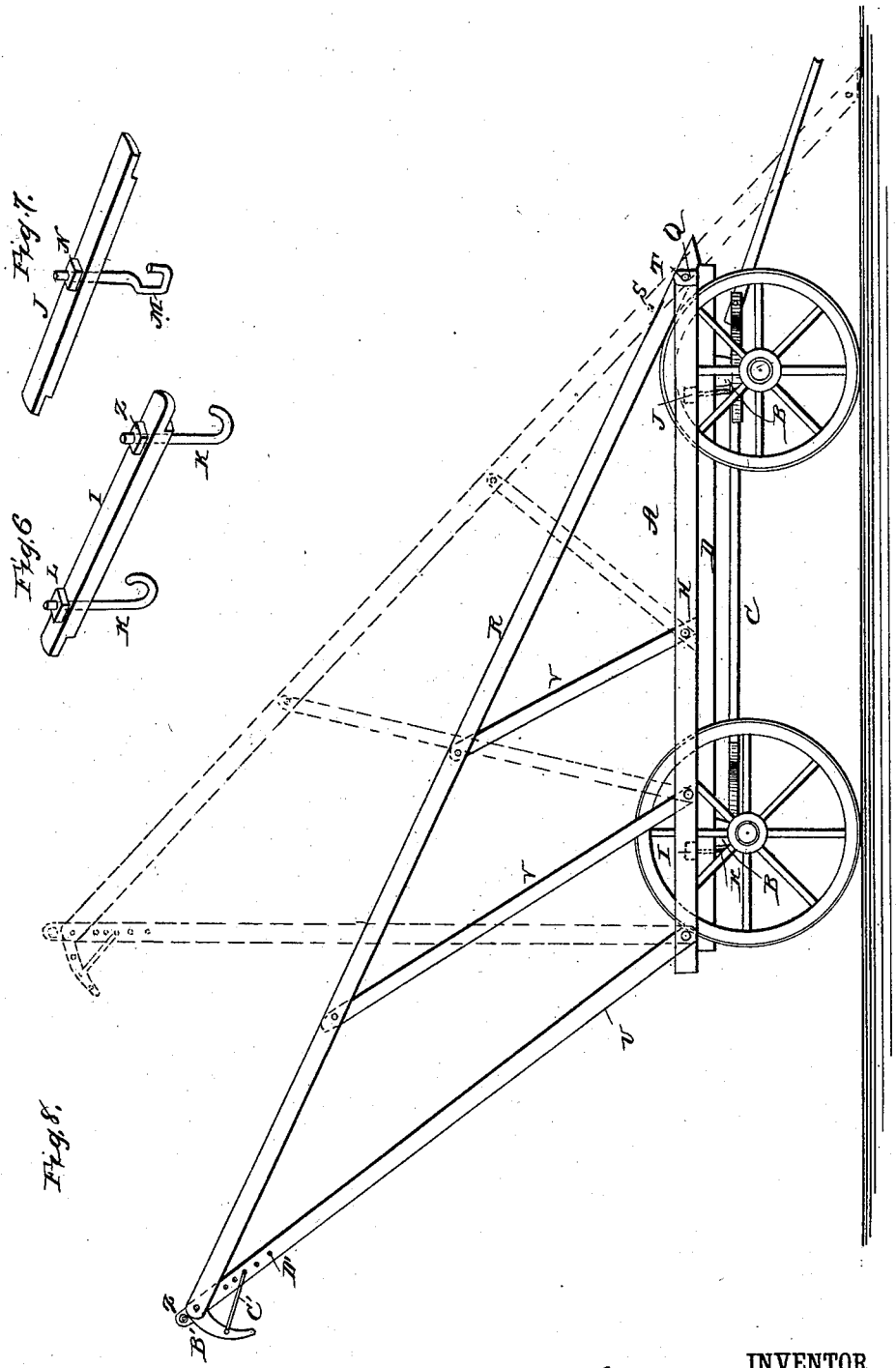
WITNESSES:
Fred G. Dieterich
J. R. Little
INVENTOR.
Joseph Dain Jr.
by C. A. Snow & Co.
ATTORNEYS.

UNITED STATES PATENT OFFICE.

JOSEPH DAIN, JR., OF MEADVILLE, MISSOURI.

HAY-STACKER.

SPECIFICATION forming part of Letters Patent No. 268,390, dated December 5, 1882.

Application filed June 30, 1882. (No model.)

*To all whom it may concern:*

Be it known that I, JOSEPH DAIN, Jr., of Meadville, in the county of Linn and State of Missouri, have invented certain new and useful Improvements in Hay-Stackers; and I do hereby declare that the following is a full, clear, and exact description of the invention, which will enable others skilled in the art to which it appertains to make and use the same, reference being had to the accompanying drawings, which form a part of this specification.

This invention relates to machines for elevating and stacking hay and straw; and it consists in certain improvements in the construction of the same, which will be hereinafter described with reference to the drawings, in which—

Figure 1 is a side view. Fig. 2 is a rear view. Fig. 3 is a plan view of the bed-frame. Fig. 4 is a plan view of the carrier. Fig. 5 is a plan view of the pitcher-teeth. Figs. 6 and 7 are detail views of the fastenings for the bed-frame; and Fig. 8 is a side view, showing the machine ready to be moved.

The same letters refer to the same or corresponding parts in all the figures.

A represents an ordinary wagon running-gear, of which B B are the bolsters, and C the reach.

D D are sills placed longitudinally upon the bolsters and connected by cross bars or braces E, F, and G at the front and rear ends and middle, respectively.

H H are longitudinal parallel beams placed securely upon the ends of the cross-braces, and forming, with the latter and the sills D, the bed-frame of the machine, which is supported by said sills upon the bolsters B.

To secure the bed-frame upon the running-gear, I employ two cross-bars, I J, of a length to fit transversely across the sills D. The former, I, has a pair of hooks, K K, which catch under the rear bolster, and are tightened by nuts L upon their upper screw-threaded ends. The bar J has a single hook, M, catching under the reach, near the front end of the latter, and tightened by a nut, N. The bed-frame is thus secured immovably to the running-gear, with its side pieces, H H, outside the wheels.

The sills D D are extended in rear of the rear brace, F, and are connected by a cross-bar, O, bolted under said sills, and having bearings for a pair of grooved pulleys or sheaves, P, over which the hoisting-tackle is reeved, as will be hereinafter explained.

The side beams, H, are provided at their front ends with strong hooks or U-shaped brackets Q, to receive and support the inclined track-beams R, which are provided near their lower ends with perforations S to receive bolts T, for the reception of which openings are also provided in the brackets Q, and which serve to hold the track-beams in any position to which they may be adjusted. The upper ends of the track-beams R are supported by uprights U, pivoted at their upper ends to said track-beams, and at their lower ends to the ends of the brace F of the bed-frame. The inclined track-beams R are supported by additional braces V, pivoted to said beams and to the sides H of the bed-frame. It will be seen that, owing to this construction, the track-beams may, when the bolts T are removed, be thrown downward and forward until their lower ends rest upon the ground, as in Fig. 1; or they may be thrown up and back, as in Fig. 8, thus lowering their upper and raising their lower ends, so that horses may be conveniently hitched to the running-gear and the machine moved from place to place. The uprights U U are connected by diagonal braces W by a central brace, X, and by a top brace, Y. The latter has pulleys Z, over which the hoisting-ropes are passed.

A' A' are braces hinged under the rear cross-piece, F, of the bed-frame, and adapted to be folded under the same while the machine is being moved, or to be extended and rest upon the ground while it is in use, thus serving as supports to hold it steady during operation.

To the upper ends of the track-beams R are hinged short curved tracks B', having hinged supporting-rods C', the lower ends of which may be adjusted in any one of a series of perforations, D', in the upper ends of uprights U, thus enabling the tracks B', which form extensions of the tracks R, to be adjusted at any desired position in relation to the latter.

E' is the carrier, which consists of a rectangular frame made, in order to combine strength with lightness, of gas-pipe or other metal pipe, jointed at the corners by elbows F'. The frame E' is secured upon the ends of a pair of long arms, G' G', and it is provided with cross-pieces H', placed near enough together to keep hay and straw from falling through. The arms G' G' are connected at the rear of frame E' by a cross-piece or shaft, I', upon which a pair of flanged wheels, J', are mounted, and adapted to run upon the tracks R. The rear ends of the arms G' are provided with upward-projecting castings K', between the sides of which are journaled a pair of friction-rollers, L' M', a sufficient distance apart to admit one of two beams, N', pivoted at the rear corners of the bed-frame. The beams N' are provided at their front ends with downward-projecting castings O', embracing the arms G', and having a pair of friction-rollers, P' Q', above and below the latter, which, as will be observed, owing to this construction, may slide freely longitudinally upon the beams N'.

R' R' represent a series of teeth or fingers connected by cross-braces S', below which two of said teeth extend, as at T', forming arms, by which the tooth-frame is hinged to the carrier-arms G'. Two of the teeth R' have downward-projecting brackets U', forming bearings for the flanged wheels V', adapted to run upon the track-beams R.

The hoisting-ropes, which are denoted by W', may be secured to the upper corners of the track-beams R, thence passed down under the flanged carrier-wheels J', which, for this purpose, should be provided with grooves X', thence up over the pulleys Z and finally down over the pulleys P. There being two pulleys P, the draft may be over either of them, and thus in any desired direction, without changing the tackle.

From the foregoing description, taken in connection with the drawings hereto annexed, the operation of my invention will be readily understood. The machine being set where it is desired to make the stack, the track-beams R are let down so as to rest upon the ground, or adjusted as desired, substantially as shown in Fig. 1. The horse is hitched to the end of the hoisting-rope, and pulls at right angles with the machine until the carrier upon which the load has been deposited by a rake, or in any suitable manner, reaches the top of the inclined track. The wheels of the pitcher-tooth frame now run out upon the extension of the track, which has been adjusted, as may be desired, to tilt the pitcher-frame more or less, thus causing the load to dump or drop more or less freely, as may be desired, by the hand stationed upon the stack, who has it in his power to adjust the said extension-tracks as he may wish. When the hoisting-rope is slackened the carrier will, by its own weight, return to the ground for another load. When it is desired to move the machine the carrier may be pulled up upon the inclined track high enough to be out of the way, and there made fast. The track-rails may then be adjusted in the positions shown in Fig. 8, where they are out of the way of the horses, which may then be hitched to the machine.

Having thus described my invention, I claim and desire to secure by Letters Patent of the United States—

1. In a hay-stacker, the combination, with the running-gear of a wagon, of the bed-frame consisting of sills supported longitudinally upon the bolsters of said running-gear, cross-pieces mounted upon said sills, and side pieces secured to said cross-pieces outside the wagon-wheels, as set forth.

2. The combination of the running-gear, the bed-frame constructed as described, the cross-pieces resting upon the sills and having hooks catching around the reach and bolster, and nuts for tightening and securing said hooks.

3. In a hay-stacker, the combination, with the bed-frame, of an inclined track consisting of rails or beams and braces or uprights to which said rails are pivoted, the lower ends of said braces being pivoted to the bed-frame, as set forth.

4. The combination of the bed-frame, the uprights and braces pivoted thereto, the U-shaped hooks or brackets at the front corners of said bed-frame, and the inclined track-rails pivoted to the upper ends of said uprights and braces, and resting in said hooks or brackets, as set forth.

5. In a hay-stacker, the combination, with the bed-frame having U-shaped hooks or brackets, of the inclined swinging track-rails, arranged substantially as described, and having perforations at their lower ends, and bolts by which said track-rails may be secured in said U-shaped brackets in any position to which they may be adjusted, as set forth.

6. In a hay-stacker, the combination, with the inclined track-rails, of curved extensions hinged to the upper ends of the same, and hinged adjustable rods by which said extensions may be adjusted and supported in any desired position, as set forth.

7. In a hay-stacker, the combination of the inclined track, the bed-frame, beams pivoted to the rear ends of the latter, and the carrier traveling upon the inclined track, and having rearwardly-extending arms sliding longitudinally upon said pivoted beams, as set forth.

8. The combination of the bed-frame, the carrier having rearwardly-extending arms, beams pivoted at the rear corners of the bed-frame, castings on said arms and beams, and friction-rollers mounted in said castings above and below said arms and beams, as set forth.

9. The combination of the inclined track, the bed-frame, the beams pivoted at the rear corners of the latter, the carrier-arms sliding longitudinally upon said beams, the shaft connecting said carrier-arms, the flanged wheels mounted upon said shaft and traveling upon the track, the carrier-frame, and the pitcher-tooth frame hinged between the carrier-arms, and having flanged wheels traveling upon the track, as set forth.

10. The combination of the inclined track-rails, the curved extensions hinged adjustably at the upper ends of the same, the carrier, and the pitcher-tooth frame hinged between the arms of the latter, and having flanged track-wheels, as set forth.

11. In a hay-stacker, the combination, with the running-gear and the bed-frame, of braces hinged under the rear end of said bed-frame, and adapted to be folded up under the same when the machine is being moved, as set forth.

12. The combination of the running-gear, the bed-frame mounted on the same, supports pivoted to said bed-frame, the inclined track pivoted to said supports, the beams hinged at the rear end of the bed-frame, the carrier having arms sliding upon said beams, track-wheels mounted on said arms, a hinged toothed frame, wheels thereon traveling on the track, and curved extensions hinged adjustably at the upper end of said track, as set forth.

13. The herein-described improved hay-stacker, consisting essentially of the running-gear, the bed-frame, sheaves P P at the rear end thereof, the swinging inclined track having adjustable curved extensions, friction-pulleys at the top of said track, beams pivoted at the rear end of the bed-frame, the carrier having rearwardly-extending arms sliding upon said beams, flanged and grooved track-wheels mounted upon said arms, the hinged toothed frame, track-wheels mounted on said frame, and hoisting-ropes secured at the upper corners of the track, passed under the grooved track-wheels of the carrier, over the pulleys at the top of the track, and finally over one of the two sheaves at the rear end of the bed-frame, as set forth.

In testimony that I claim the foregoing as my own I have hereto affixed my signature in presence of two witnesses.

JOSEPH DAIN, Jr.

Witnesses:
JOSEPH DAIN,
HENRY L. STURGES.